United States Patent [19]
Hoffman

[11] 3,753,497
[45] Aug. 21, 1973

[54] POLLUTION SKIMMER

[76] Inventor: Benedict J. Hoffman, 2230 Chestnut St., Fort Wayne, Ind.

[22] Filed: June 10, 1971

[21] Appl. No.: 151,699

[52] U.S. Cl............................ 210/242, 210/DIG. 21
[51] Int. Cl............................................. E02b 15/04
[58] Field of Search............... 210/242, 83, DIG. 21, 210/169

[56] References Cited
UNITED STATES PATENTS

| | | | |
|---|---|---|---|
| 3,628,664 | 12/1971 | Stanwood | 210/169 |
| 3,547,553 | 12/1970 | Stanfield | 210/DIG. 21 |
| 2,330,508 | 9/1943 | McCall | 210/242 |
| 3,635,342 | 1/1972 | Mourlon et al. | 210/242 |
| 3,534,859 | 10/1970 | Amero et al. | 210/DIG. 21 |
| 513,787 | 1/1894 | Hogan | 210/242 |

Primary Examiner—Samih N. Zaharna
Assistant Examiner—T. A. Granger
Attorney—Jeffers and Rickert

[57] ABSTRACT

A skimmer for removing supernatant matter such as oil from a liquid such as water is disclosed having a base portion containing a centrally located drain and a plurality of troughs extending outwardly laterally from the drain but somewhat skewed relative to radii from the drain to aid in the formation of a vortex within the drain. The base portion is supported by a like plurality of laterally extending wings each having a density less than that of the liquid and each independently adjustably affixed to the base portion so that the elevation of the base portion relative to the liquid surface may be varied. A drain tube is connected to the lower end of the drain and after passing through a pump discharges the matter which is entering the drain into a surface material receptacle which may be a multiple outlet container for separating immiscible liquids. A V-shaped weir partially surrounding the base and wings and mechanically connected thereto may be provided for use if the skimmer in flowing liquids and the skimmer, weir and pump may all be mechanically interconnected so as to float as a unit.

6 Claims, 3 Drawing Figures

PATENTED AUG 21 1973

INVENTOR
BENEDICT J. HOFFMAN

BY *Jeffers and Rickert*
ATTORNEYS

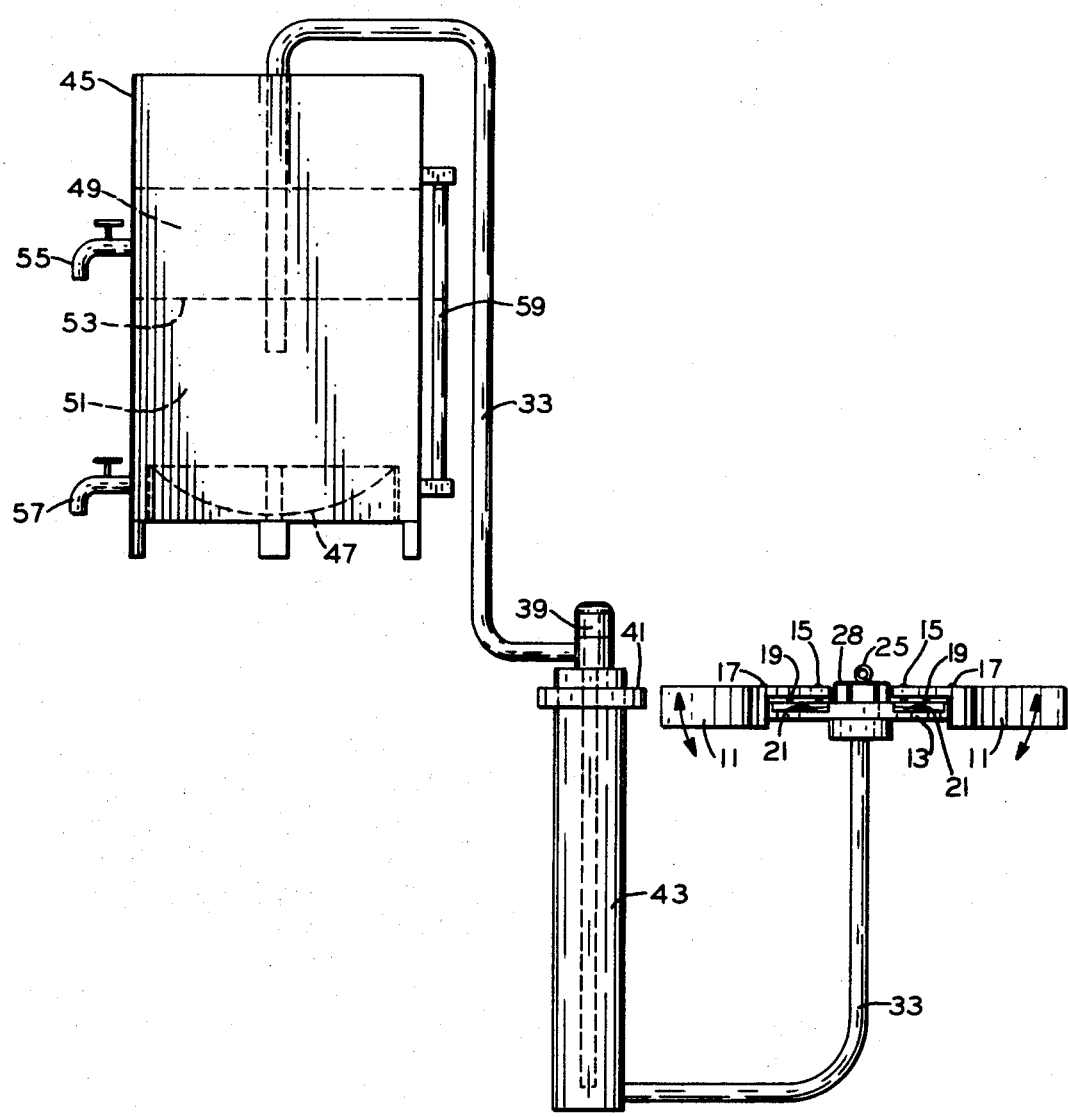

3,753,497

POLLUTION SKIMMER

BACKGROUND OF THE INVENTION

This invention relates to a skimmer and more particularly to a skimmer for removing surface pollutants such for example as oil from a body of moving or calm water. Smaller versions of the present invention may be used in a swimming pool or other small body of water for removing surface pollutants and in larger versions the present invention may be adapted to removing large oil slicks from oceans or lakes to protect beaches and animal life. A V-shaped weir effective to channel a flowing liquid into the skimmer may be used in moving water environments. Skimmers are, of course, known in the prior art and run the complete spectrum from extremely large skimmers such as that illustrated in U.S. Pat. No. 3,534,859, to Amero et al. which is designed solely for removing large oil slicks to the skimmer illustrated in U.S. Pat. No. 275,134 which is to be used in a barrel to always remove the liquid from the barrel from the liquid surface so as to avoid removing sediment from the barrel. The prior art skimmers as illustrated by these two United States patents suffer from a number of drawbacks. Large scale skimmers are cumbersome and lack versatility. The creation of a vortex in the drain portion of these skimmers is by accident rather than intentionally introduced. The prior art skimmers are generally limited in the type material which may be removed from the surface. For example, the Amero et al. skimmer removes only oil and will not remove flotsam. The Amero et al. screen may become easily clogged and the Amero device is not suitable for use in a moving body of water such as a stream.

Accordingly, it is one object of the present invention to provide a versatile skimmer usable in a variety of environments.

Another object of the present invention is to provide a device for removing floating contaminants which is not restricted in the types of contaminants that may be removed.

A further object of the present invention is to provide a device for removing supernatant matter from a liquid which is adaptable to a variety of conditions.

The foregoing as well as other objects and advantages of the present invention will appear more clearly from the following detailed disclosure read in conjunction with the accompanying drawings in which:

BRIEF DESCRIPTION OF THE DRAWING

FIG. 3 is a partially schematic showing of the skimmer, pump and surface material separating receptacle illustrating a complete system for the present invention.

DESCRIPTION OF THE PREFERRED EMBODIMENT

Figure 1:
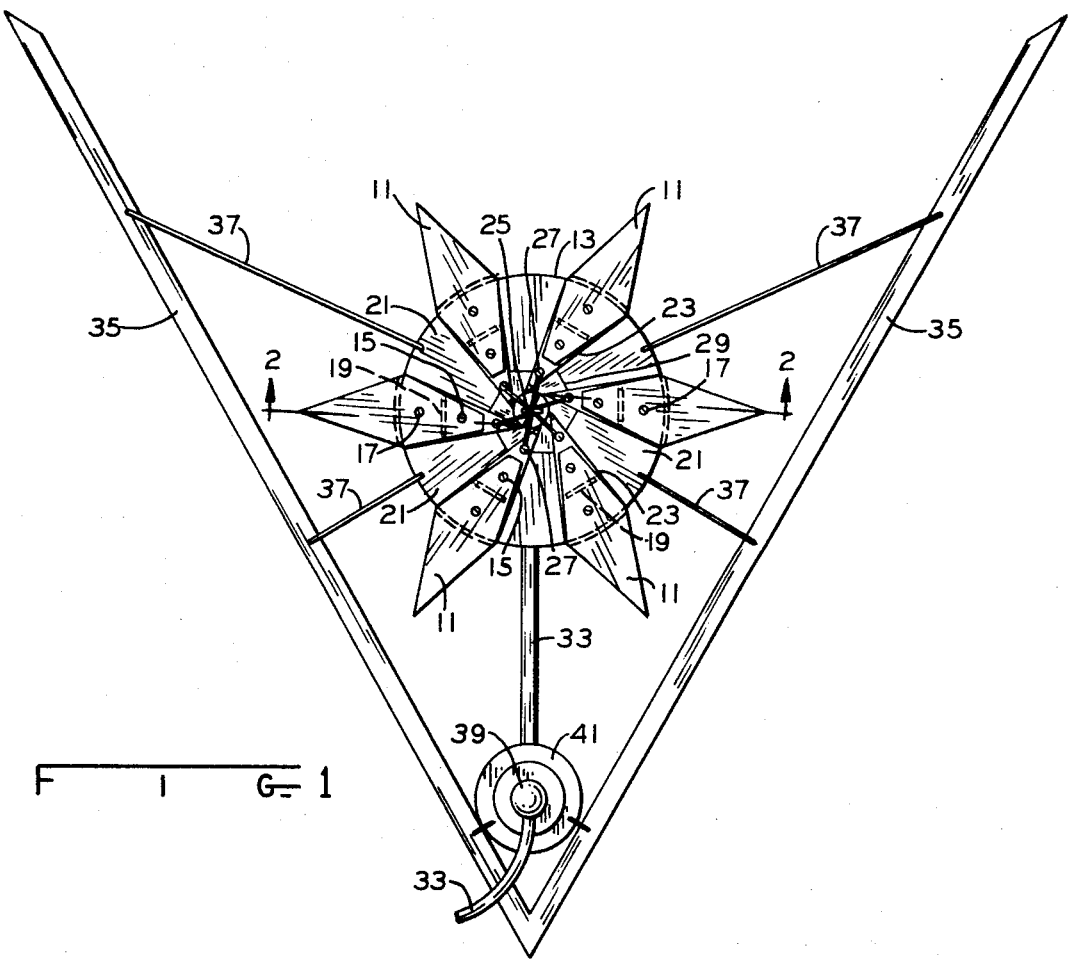
FIG. 1 is a top view of the skimmer, pump and weir of the present invention joined together as an integral unit.
Figure 2:
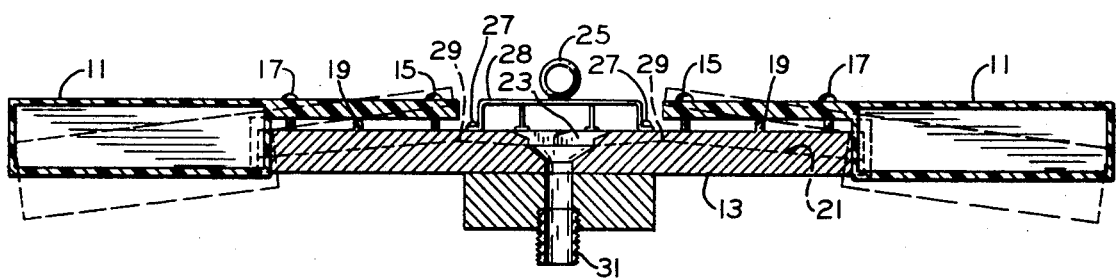
FIG. 2 is a cross sectional view of the skimmer of FIG. 1 along the broken cross sectional line 2—2.

Considering first FIG. 2 which shows a cross sectional view of the skimmer of the present invention, the skimmer is seen to consist of a plurality of laterally extending wings 11 or other means for supporting the skimmer in a liquid. These wings are, of course, less dense than the liquid and provide the floating support for the skimmer structure. The wings are attached to a base portion 13 by means of a pair of screws 15 and 17 in conjunction with a fulcrum 19 so that each individual wing 11 is independently adjustable to raise or lower the base portion 13 in the liquid. Thus, for example, to lower the wing 11 and thus raise the base 13 further out of the water in the area of the particular wing being adjusted screw 15 would be loosened somewhat and screw 17 tightened. Each of the wings may be adjusted in this manner to allow leveling for an all around flow or to compensate the skimmer attitude in a flowing stream environment. The base portion 13 of the skimmer is provided with a plurality of troughs having bottoms 21 and side walls 23. The piece forming the side walls 23 is as illustrated in FIGS. 1 and 2 configured similar to the corresponding overlying portion of the wing and thus these side walls are seen in FIG. 1 only near the center of the base. The trough side walls near the center of the base provide a point of attachment for a transporting ring 25 which is screwed to the base by means of screw 27. The trough bottom 21 reaches its highest point at 29 and from thereon toward the center forms the beginnings of a funnel-like drain into which supernatant matter such as a surface liquid or other pollutant may flow. This drain is centrally disposed in the base portion of the skimmer and the lower portion of the drain 31 is, for example, threaded to allow the attachment of a drain tube. Such a drain tube 33 is illustrated in FIGS. 1 and 3.

Turning now to FIG. 1 which illustrates a top view of the skimmer mechanically interconnected with a V-shaped weir 35 which the skimmer may be used in conjunction with when it is desired to skim supernatant matter from a flowing body of water, the skimmer is attached to the weir by a series of ribs or lines 37. A pump 39 is also mechanically interconnected with the V-shaped weir 35 and is, of course, in circuit with the drain tube 33. In flowing water environments, the open end of the V-shaped weir or baffle 35 is directed up stream so as to collect the oncoming surface material.

As seen in FIG. 1, the skimmer (with or without the weir) has the troughs as well as the inner portions of the laterally extending wings skewed somewhat relative to radii extending from the center of the drain. These troughs are skewed so as to induce a vortex within the drain to speed up the drainage portion of the skimming operation. As illustrated in the top view of FIG. 1, the liquid entering the drain will tend to have counterclockwise vortices induced due to this skewing of the troughs. This counterclockwise vortex is, of course, best suited for use in the Southern Hemisphere and the direction of skewing of the troughs and wings might be reversed from that shown in FIG. 1 for a skimmer to be used in the Northern Hemisphere.

While FIG. 1 illustrates the pump as being supported near the vortex of the weir, the pump may be provided with a floatation collar 41 and float independently as illustrated in FIG. 3 or could be hung from the side of a swimming pool if the skimmer were to be used in that environment. Further in the case, of for example, a small home swimming pool the pump 39 may be eliminated entirely and siphonage relied upon to effect the skimming process. The somewhat schematically illustrated embodiment of FIG. 3 illustrates the pump 39 as a sump pump type structure combined with a small recovery tank 43. The liquid flowing into the recovery tank 43 is, of course, pumped out by the pump 39 and into a surface material receptacle 45 which is here illustrated as a container for separating a plurality of immiscible liquids. The entire drain tube of course has one end attached to the skimmer and the other end extending into the receptacle which may be provided with a concave bottom 47 to aid in the separation of the two immiscible liquids. As illustrated, the receptacle is partially filled with a less dense liquid such as oil 49 and a more dense liquid such as water 51 and has an oil-water interface 53 between the two immiscible liquids. A plurality of outlets 55 and 57 are provided to periodically drain off the thus separated liquids. These outlets are of course at different elevations so that a given outlet provides a drain for a given one of the liquids.

The receptacle 45 may be made of glass or provided with a transparent window section so that the respective volumes of liquids within the receptacle may be monitored or a sight tube 59 having two or more ducts communicating with the tank may be provided.

Thus while the present invention has been described with respect to preferred embodiments, numerous modifications will suggest themselves to those of ordinary skill in the art and accordingly the scope of the present invention is to be measured only by that of the appended claims.

I claim:

1. A device for removing floating contaminants from the surface of a body of liquid comprising:

a solid base portion having an outer periphery and a centrally disposed drain to which a drain tube may be attached:

a plurality of laterally extending divergent fluid conducting troughs constructed and arranged within the thickness of said base with a first end located adjacent to and communicating with said drain and a second end located at the outer periphery of said base, said solid base portion thickness providing a pair of side walls and a bottom wall for each trough with each trough being somewhat skewed relative to radii from said centrally disposed drain to impart a somewhat tangential direction to a liquid flow through the troughs to thereby aid in the formation of a vortex in the said drain:

a plurality of laterally extending divergent longitudinal wing-like members constructed and arranged to float on a body of liquid, each said member having a first end and a second end, said first ends arranged around said base portion and adjustably pivotably connected thereto, said second ends extending beyond said base portion outer periphery and comprising float means for buoyantly supporting the device in a liquid, there being a like plurality of troughs and wing-like members with the space between adjacent float means disposed in general alignment with a corresponding trough, each wing-like member being adjustable about its pivot to allow the base portion to be supported in a body of liquid with the trough bottom walls somewhat below the surface of the liquid whereby surface material may flow inwardly between adjacent float means through said troughs and into said drain;

a drain tube attached at one end to said drain; and a surface material receptacle remote from said drain, said drain tube other end positioned to allow discharge of surface materials into said receptacle.

2. The device of claim 1 wherein said drain tube other end is positioned below said liquid surface so that surface materials flow from said liquid surface through said drain tube and into said receptacle by siphonage.

3. The device of claim 1 further comprising means in circuit with said drain tube for pumping said surface materials through said drain tube whereby said drain tube other end need not necessarily be below said liquid surface.

4. The device of claim 1 wherein said receptacle comprises a container for separating immiscible liquids having different densities, said container having an inlet adapted to be connected to said drain tube other end and having a plurality of outlets at different elevations, a given outlet providing a drain for a given one of said liquids.

5. The device of claim 1 further comprising a baffle partially surrounding said base and said wing-like members for channeling flowing liquid and contaminants toward said drain.

6. The device of claim 3 further comprising a baffle partially surrounding said base and said wing-like members for channeling flowing liquid and contaminants toward said drain;

said baffle, said base and attached wing-like members, and said pumping means being mechanically interconnected so as to float on said liquid as a single unit.

* * * * *